Patented Aug. 3, 1926.

1,594,389

UNITED STATES PATENT OFFICE.

HENRI THELLIER, OF LILLE, FRANCE, ASSIGNOR TO SOCIÉTÉ POUR L'APPLICATION INDUSTRIELLE DES BREVETS PEUFAILLIT, OF LILLE, FRANCE.

PROCESS FOR RETTING OR STEEPING FLAX AND OTHER VEGETABLE FIBERS.

No Drawing. Application filed December 26, 1924, Serial No. 758,302, and in France January 18, 1924.

This invention relates to a process for retting or steeping flax and like plants with the object of extracting the gummy substances so as to obtain a fiber freed from such substances.

It has before been proposed to boil the fibrous material under pressure in a water bath containing a quantity of hydrocarbon. As a result of many experiments it has been found that a better result is obtained if instead of employing fresh water and hydrocarbon, some of the liquid which has already been used in the treatment is employed, together with some fresh water and hydrocarbon.

According to this invention, therefore, flax or other fibrous plant is boiled in a bath consisting partly of some of the liquor which has been used in treating the plant in question according to the process referred to above, and partly of water and a small amount of hydrocarbon. Thus, for the first charge, according to the old process, water with, say, 3 to 5% of liquid hydrocarbon is used, while for the second charge the bath consists of half the liquor from the first charge with the requisite amount of fresh water to which has been added a quantity of hydrocarbon sufficient to bring the total hydrocarbon content of the bath up to about 3% of the weight of the charge to be treated.

It is found that by employing some of the old liquor not only is the amount of fuel required diminished because the old liquor is already hot when used over again for a second operation, but the liquor containing as it does a quantity of the encrusting gummy material extracted from the first charge acts as a more efficient solvent for the second charge than does clean water and petrol alone. Inasmuch as the encrusting gummy material contained in the liquor has certain solvent properties, an economy in petrol is effected.

Obviously part of the liquor from this second charge may be used for the third charge, and so on.

What I claim is:—

1. The process of treating fibrous vegetable material which consists in steeping the material under pressure in a bath formed partly of liquor which has been previously used for steeping such fibrous material and partly of water and a liquid hydrocarbon.

2. The process of treating fibrous vegetable material which consists in steeping such material under pressure in a hot bath of water and liquid hydrocarbon and then steeping another charge of material under pressure in a hot bath consisting partly of a portion of the liquor resulting from the first operation and partly of fresh water and liquid hydrocarbon.

In testimony that I claim the foregoing as my invention I have signed my name this fourth day of December, 1924.

HENRI THELLIER.